US006829251B2

(12) United States Patent
Duvaut et al.

(10) Patent No.: US 6,829,251 B2
(45) Date of Patent: Dec. 7, 2004

(54) SYSTEM AND METHOD FOR INCREASING DATA CAPACITY IN COMMUNICATION SYSTEMS

(75) Inventors: Patrick Duvaut, Belford, NJ (US); Ehud Langberg, Wayside, NJ (US); William Scholtz, Red Bank, NJ (US); Laurent Pierrugues, Rahway, NJ (US); Oliver Moreno, Eatontown, NJ (US)

(73) Assignee: Globespanvirata, Inc, Red Bank, NJ (US)

( * ) Notice: Subject to any disclaimer, the term of this patent is extended or adjusted under 35 U.S.C. 154(b) by 36 days.

(21) Appl. No.: 10/315,743

(22) Filed: Dec. 10, 2002

(65) Prior Publication Data

US 2003/0108065 A1 Jun. 12, 2003

Related U.S. Application Data

(60) Provisional application No. 60/338,939, filed on Dec. 10, 2001, provisional application No. 60/341,654, filed on Dec. 16, 2001, provisional application No. 60/346,809, filed on Jan. 7, 2002, provisional application No. 60/348,575, filed on Jan. 14, 2002, provisional application No. 60/350,552, filed on Jan. 22, 2002, provisional application No. 60/353,880, filed on Feb. 2, 2002, provisional application No. 60/354,888, filed on Feb. 6, 2002, and provisional application No. 60/355,117, filed on Feb. 8, 2002.

(51) Int. Cl.[7] .................................................. H04J 1/16
(52) U.S. Cl. ........................................ 370/468; 370/493
(58) Field of Search ................................. 370/468, 493, 370/494, 495

(56) References Cited

U.S. PATENT DOCUMENTS

| 5,742,527 A | 4/1998 | Rybicki et al. | 364/705.05 |
|---|---|---|---|
| 5,982,784 A | 11/1999 | Bell | 370/485 |
| 6,061,392 A | 5/2000 | Bremer et al. | 375/222 |
| 6,219,378 B1 | 4/2001 | Wu | 375/231 |
| 6,259,746 B1 * | 7/2001 | Levin et al. | 375/295 |
| 6,285,708 B1 | 9/2001 | Shively et al. | 375/222 |
| 6,317,495 B1 | 11/2001 | Gaikwad et al. | 379/417 |
| 6,452,907 B1 | 9/2002 | Levin | 370/252 |
| 6,674,768 B1 * | 1/2004 | Okamura | 370/468 |
| 2001/0022777 A1 | 9/2001 | Bourget | 370/210 |
| 2002/0075952 A1 | 6/2002 | Verbin | 375/231 |

OTHER PUBLICATIONS

PCT Preliminary Search Report Form PCT/ISA/220 for PCT/US02/39446.
Crosstalk Cancellation in DMT Communication Systems, Rudberg et al.; Sep. 1999; pp. 1–4.
Crosstalk Cancellation in xDSL Systems, Zeng et al.; Mar. 30, 2001 pp. 1–25.
Acquisition Systems, Number of Bits and Dynamic Range, Mercer; Jun. 6, 2001; pp. 1–5.
Spectral Optimization and Joint Signaling Techniques for Communication in the Presence of Crosstalk, Gaikwad et al.; Jul. 1998.
Asymmetric Digital Subscriber Line (ADSL) Transceivers G.992.1, International Telecommunication Union; Jun. 1999.

(List continued on next page.)

Primary Examiner—Melvin Marcelo
(74) Attorney, Agent, or Firm—Thomas, Kayden, Horstemeyer & Risley

(57) ABSTRACT

Systems and methods for increasing data capacity in communication systems is presented. In one embodiment, line characteristics are determined, and a downstream bandwidth is adaptively allocated in response to the determined line characteristics. In this regard, the upstream and downstream bandwidths may be seen as adaptively changing as a function of line characteristics.

21 Claims, 13 Drawing Sheets

OTHER PUBLICATIONS

Annex H: Specific Requirements for a Synchronized Symmetrical DSL (SSDSL) System Operating in the Same . . . G.992.1, International Telecommunication Union; Oct. 2000.

Splitterless Asymmetric Digital Subscriber Line (ASDL) Transceivers G.922.2, International Telecommunication Union; Jun. 1999.

Handshake Procedures for Digital Subscriber Line (DSL) Transceivers G.994.1, International Telecommunication Union; Feb. 2001.

Overview of Digital Subscriber Line (DSL) Recommendations G.995.1, International Telecommunication Union; Feb. 2001.

* cited by examiner

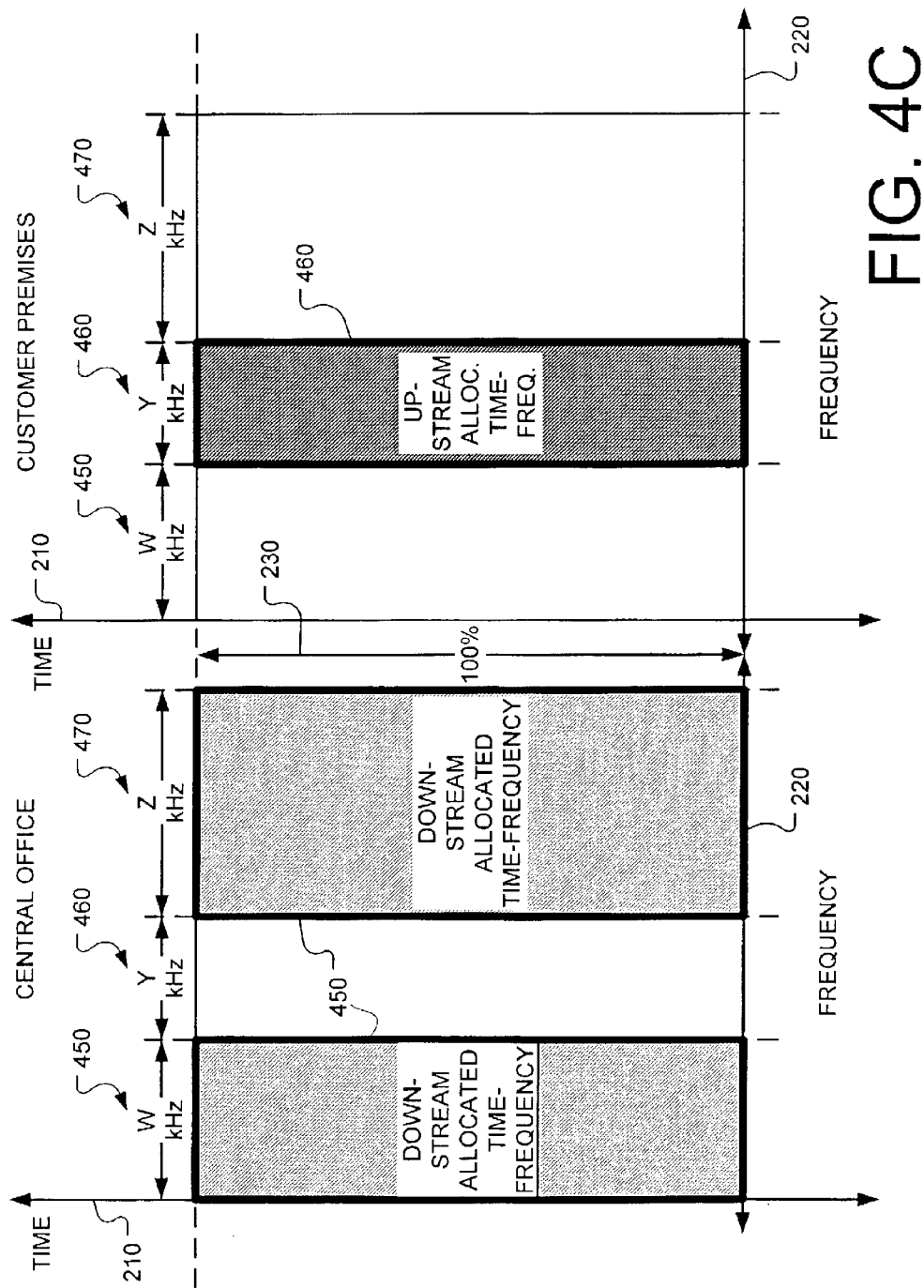

SYSTEM AND METHOD FOR INCREASING DATA CAPACITY IN COMMUNICATION SYSTEMS

CROSS REFERENCE TO RELATED APPLICATIONS

This application claims the benefit of U.S. provisional patent application Ser. Nos. 60/338,939, dated Dec. 10, 2001; No. 60/341,654, dated Dec. 16, 2001; No. 60/346,809, dated Jan. 7, 2002; No. 60/348,575, dated Jan. 14, 2002; No. 60/350,552, dated Jan. 22, 2002; No. 60/353,880, dated Feb. 2, 2002; No. 60/354,888, dated Feb. 6, 2002; and No. 60/355,117, dated Feb. 8, 2002. These U.S. provisional patent applications are incorporated herein by reference as if set forth in their entireties.

Co-pending U.S. patent applications 060706-1570 (EL 891429213 US) and 060706-1680 (EL 891429227 US), both mailed on Dec. 10, 2002, are also incorporated herein by reference as if set forth in their entireties.

FIELD OF INVENTION

The present invention relates generally to data communication, and, more particularly, to systems and methods for increasing data capacity in communication systems.

BACKGROUND

Industries related to modern communication systems have seen a tremendous growth due to the increasing popularity of the Internet. As the number of Internet users increases, there is a corresponding increase in data traffic, which sometimes leads to a saturation of communication channels, thereby impeding information exchange between two sites (e.g., central office and customer premises). There is, therefore, a need in the industry for greater data capacity in communication systems.

SUMMARY

The present invention provides systems and methods for increasing data capacity in communication systems.

Briefly described, in architecture, one embodiment of the system comprises a receiver configured to receive signals, and bandwidth determination logic configured to adaptively determine a downstream bandwidth in response to the received signals. The received signals have signal characteristics that are indicative of line characteristics.

The present invention can also be viewed as providing methods for increasing data capacity in communication systems. In this regard, one embodiment of such a method can be broadly summarized as determining line characteristics, and adaptively allocating a downstream bandwidth in response to the determined line characteristics.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 4C is a graph showing another example of time-frequency masks without overlapping regions between upstream and downstream masks in accordance with another embodiment of the invention.

DETAILED DESCRIPTION OF THE PREFERRED EMBODIMENTS

Figure 1:
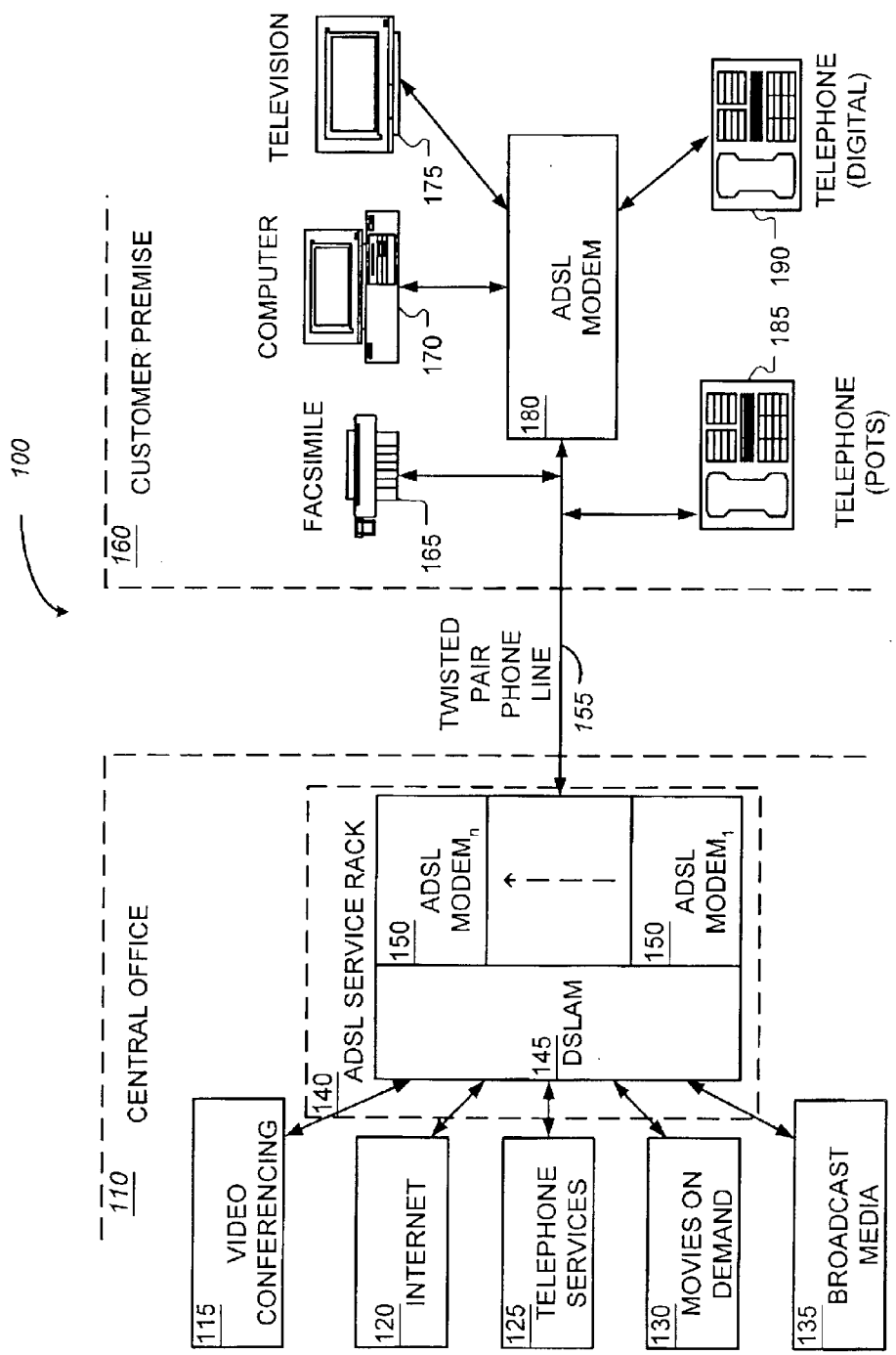
FIG. 1 is a block diagram showing a non-limiting example of a digital communication system as an asymmetric digital subscriber line (ADSL) system.

Having summarized various aspects of the present invention, reference is now made in detail to the description of the embodiments as illustrated in the drawings. While the several embodiments are described in connection with these drawings, there is no intent to limit the invention to the embodiment or embodiments disclosed herein. On the contrary, the intent is to cover all alternatives, modifications, and equivalents included within the spirit and scope of the invention as defined by the appended claims.

In a broad sense, the invention as embodied in FIGS. 1 through 11 provide systems and methods for improving digital subscriber line (DSL) performance. Conceptually, each of the embodiments maximizes downstream performance, balances upstream and downstream signal ratios, and provides spectral compatibility between ADSL and concurrently-deployed services (e g, integrated services digital network (ISDN), plain old telephone systems (POTS), etc.). In maximizing downstream performance, the systems and methods are configured to determine the optimum data capacity given certain line conditions (e g., signal-to-noise ratio (SNR), line attenuation, etc.). The line conditions further provide information that permit allocation of bandwidths and time slots for upstream and downstream signals, thereby balancing the upstream and downstream signal ratios. Additionally, since the line conditions also provide information related to other concurrently-deployed services on the line, the systems and methods of FIGS. 1 through 11 also provide spectral compatibility between ADSL and other concurrently-deployed services. The optimum conditions are predetermined as a function of government regulations, known or measured physical parameters, and other factors that are well known in the art. The data transmission parameters are then adjusted according to the predetermined optimum conditions.

Figure 2:
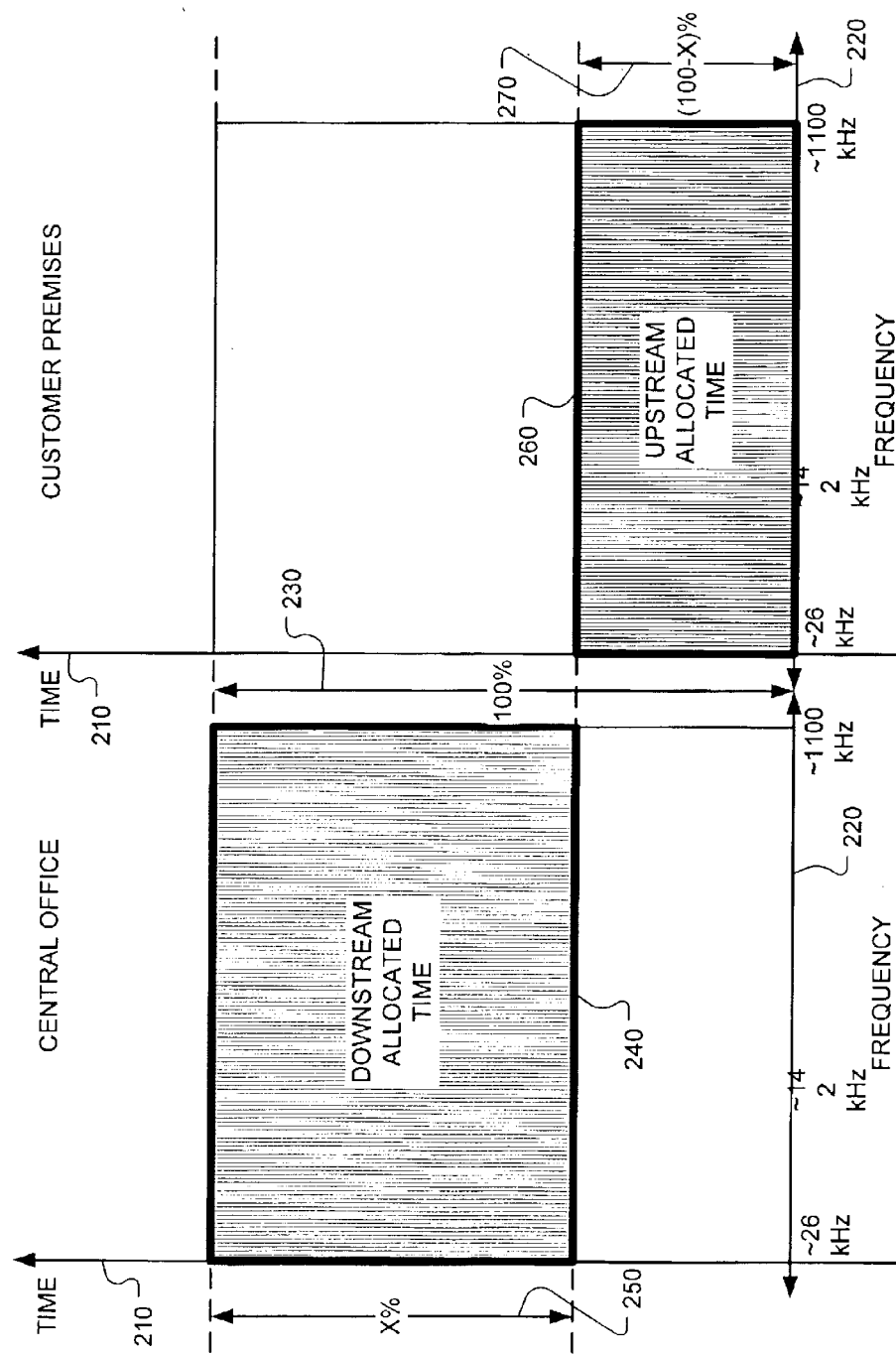
FIG. 2 is a graph showing an example of time division multiplexing.
Figure 3:
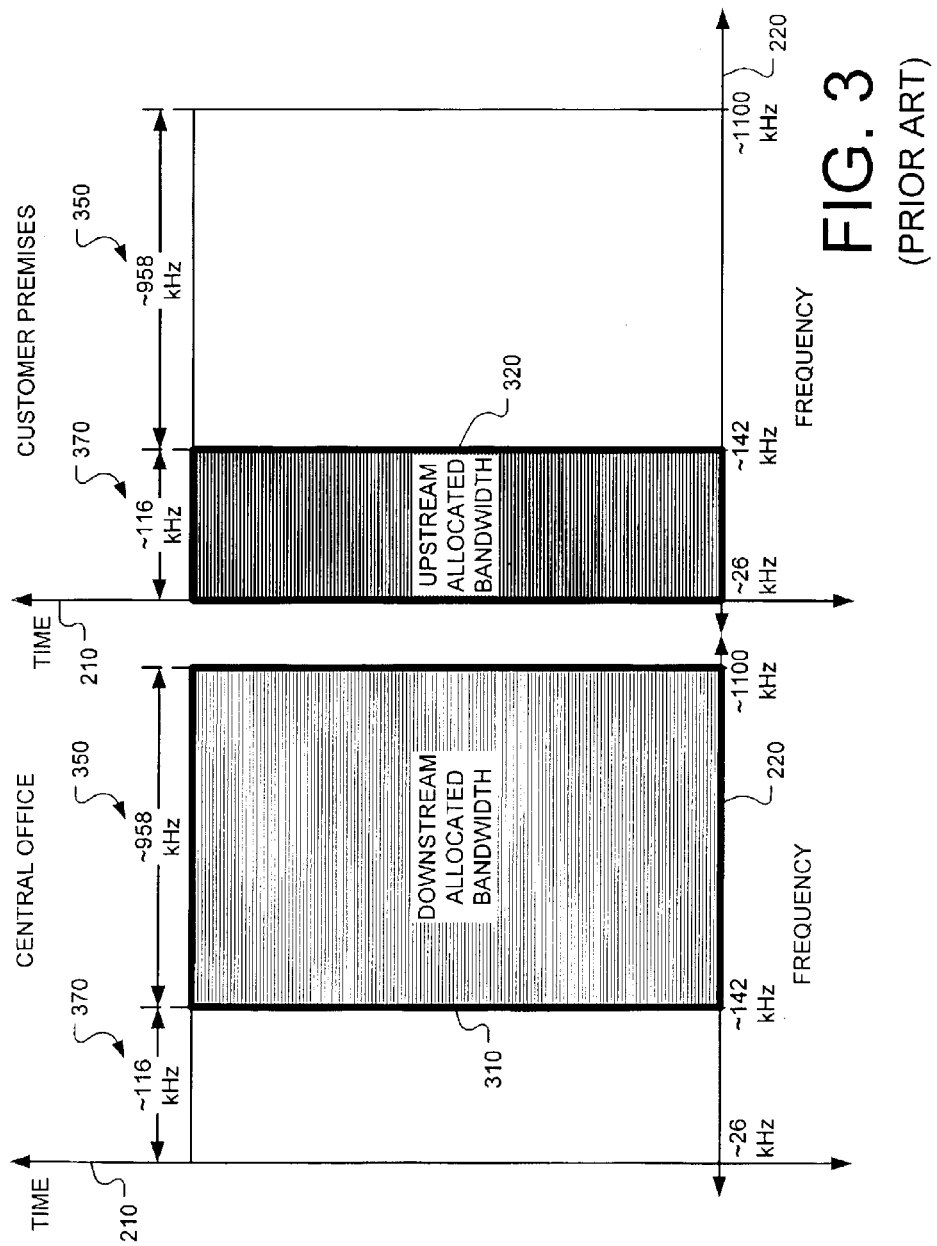
FIG. 3 is a graph showing an example of frequency division multiplexing.

FIG. 1 is a block diagram showing a non-limiting example of a digital communication system as an asymmetric digital subscriber line (ADSL) system 100. In this non-limiting example environment, a central office 110 is connected to a customer premises 160 via a two-conductor pair wire 155. On the side of the central office 110 an ADSL service rack 140 gathers information for transmission. The information may be in the form of video conferencing 115, Internet 120, telephone services 125, movies on demand 130, or broadcast media 135. All of the information is gathered at a digital subscriber line access multiplexer (DSLAM) 145, which assembles the data for transmission by ADSL modems 150. Once the information has been coded and framed, it is sent to the customer premises 160 via a local loop, generally a two-conductor pair 155. The data is received at the customer premises 160 by an ADSL modem 180. The information is then decoded and provided to the user. Several non-limiting examples of communication services that use the decoded information include a fax 165, a user's computer 170, a television set 175, an analog telephone 185, or, in the alternative, a digital telephone 195. Typically, ADSL systems employ various techniques for transmitting both upstream and downstream signals. Two examples are shown in FIGS. 2 and 3. However, with increasing data traffic, additional data capacity is desirable in such communication systems.

FIG. 2 is a graph showing an example of time division multiplexing. Two graphs are shown in which a downstream allocated time 240 for a central office is shown on the left graph while an upstream allocated time 260 for a customer premises is shown in the right graph. The graphs show frequency plotted on the x-axis 220 and time plotted on the y-axis 210, with a total data transmission time (designated as 100%) 230 divided into a downstream portion 250 (designated as X%) (X is a variable parameter that is tuned according the constraints that are determined to maximize the transmission) and an upstream portion 270 (designated as (100-X)%). As shown in FIG. 2, a downstream signal is transmitted from the central office during the X% downstream portion 250 of the total time 230 using the entire ADSL bandwidth. During this time, no upstream signals are transmitted from the customer premises. Conversely, an upstream signal is transmitted from the customer premises during the (100-X)% upstream portion 270 of the total time 230 using the entire ADSl, bandwidth During this time, no downstream signals arc transmitted. Thus, time division multiplexing may be seen as utilizing two masks: (1) a downstream mask, which spans the entire ADSL frequency bandwidth but is only used for a portion of the total time; and (2) an upstream mask, which spans the entire ADSL frequency bandwidth but is only used for the remaining portion of the total time. As seen here, time division multiplexing does not permit simultaneous transmission of both upstream and downstream signals, which, in turn, creates an inefficiency in data transmission.

FIG. 3 is a graph showing an example of frequency division multiplexing. Two graphs are shown in which a downstream allocated bandwidth 310 for a central office is shown on the left graph while an upstream allocated bandwidth 320 for a customer premises is shown in the right graph. The graphs show frequency plotted on the x-axis 220 and time plotted on the y-axis 210. In frequency division multiplexing, a downstream signal is transmitted from a central office to a customer premises in a specific downstream frequency range 350, and an upstream signal is transmitted from a customer premises to a central office in a specific upstream frequency range 370. As shown in FIG. 3, the downstream allocated bandwidth 310 and the upstream allocated bandwidth 320 have no overlapping frequencies. Thus, unlike the time division multiplexing of FIG. 2, both upstream and downstream signals in frequency division multiplexing may be transmitted simultaneously. In this sense, frequency division multiplexing may be seen as utilizing two masks: (1) a downstream mask, which spans a portion of the entire ADSL frequency bandwidth; and (2) an upstream mask, which spans a different portion of the entire ADSL frequency bandwidth. While the specific example of FIG. 3 shows the ADSL upstream bandwidth ranging from approximately 26 kHz to approximately 142 kHz and the ADSL downstream bandwidth ranging from approximately 142 kHz to approximately 1100 kHz, the principle of frequency division multiplexing (i e., using non-overlapping bandwidths for upstream and downstream signal transmission) is not limited to the specified frequency ranges, but may encompass any system utilizing non-overlapping bandwidths for upstream and downstream signal transmission. As shown in FIG. 3, only a portion of the entire ADSL bandwidth is used as the downstream allocated bandwidth 310. Thus, when there are no upstream signals, the upstream allocated bandwidth is unused, thereby creating an inefficiency. FIGS. 4A through 7 show several embodiments of the invention, which show time-frequency masks configured to permit greater data capacity.

Figure 4A:
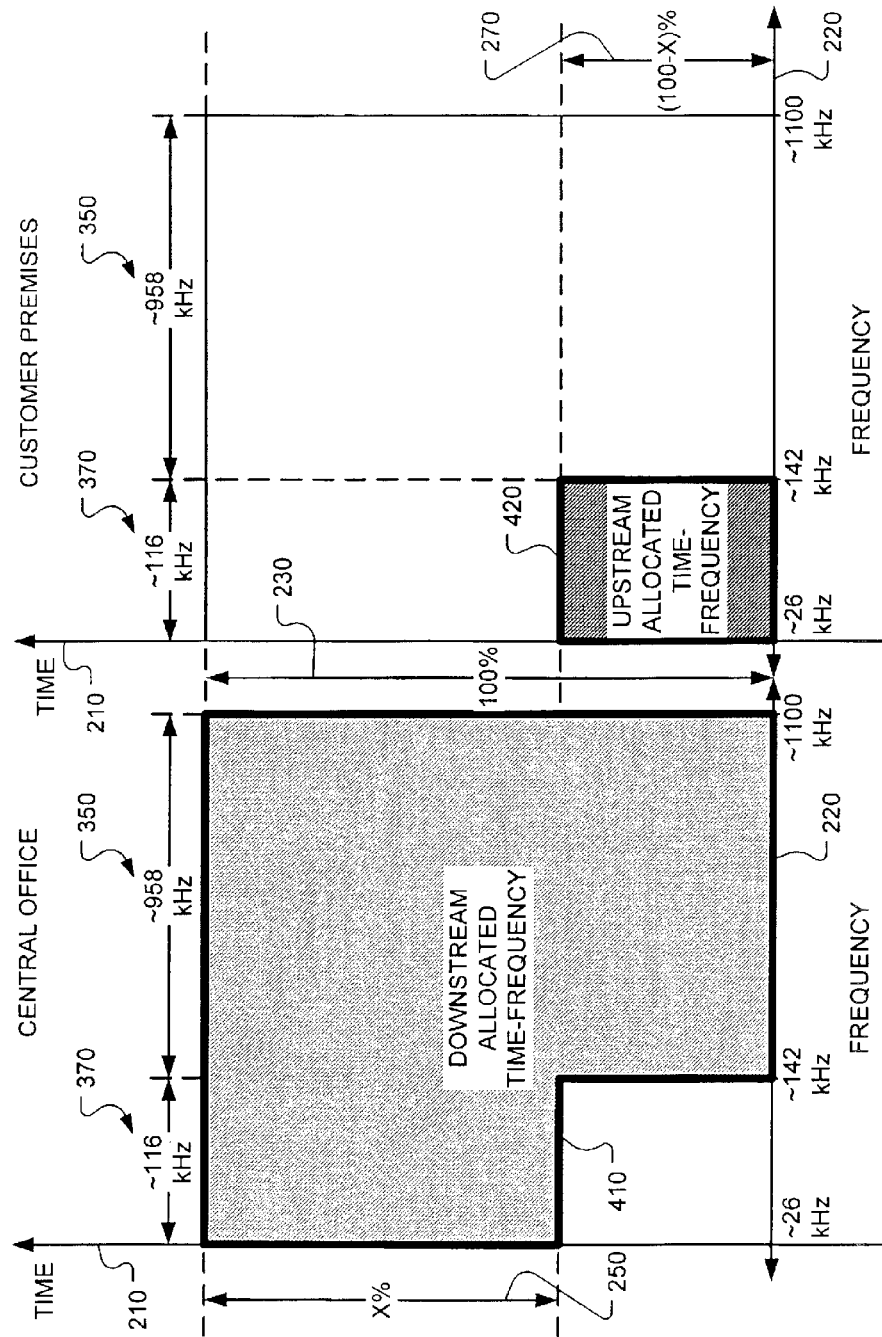
FIG. 4A is a graph showing an example of time-frequency masks without overlapping regions between upstream and downstream masks in accordance with one embodiment of the invention.

FIG. 4A is a graph showing an example of time-frequency masks without overlapping regions between upstream and downstream masks in accordance with one embodiment of the invention. Two graphs are shown in which a downstream allocated time-frequency mask 410 for a central office is shown on the left graph while an upstream allocated time-frequency mask 420 for a customer premises is shown in the right graph. The graphs show frequency plotted on the x-axis 220 and time plotted on the y-axis 210, with a total data transmission time (designated as 100%) 230 divided into a downstream portion 250 (designated as X%) and an upstream portion 270 (designated as (100-X)%). As shown in FIG. 4A, an upstream signal is transmitted from the customer premises during the (100-X)% upstream portion 270 of the total time 230 using only a portion 370 of the entire ADSL bandwidth. Thus, during the (100-X)% upstream portion 270 of the total time 230, a downstream signal may be transmitted by the central office within the unused portion 350 of the entire ADSL bandwidth. Conversely, when there is no upstream signal being transmitted from the customer premises, then a downstream signal may be transmitted using the entire ADSL bandwidth. Thus, in the embodiment of FIG. 4A, the downstream mask may be seen as an adaptive mask, which (1) spans the entire ADSL frequency bandwidth when there are no upstream signals; and (2) spans only a downstream portion 350 of the bandwidth when there are upstream signals. Hence, unlike the time-division multiplexing of FIG. 2 and the frequency division multiplexing of FIG. 3, the time-frequency mask of FIG. 4A utilizes the entire ADSL frequency bandwidth during 100% of the data transmission time, thereby reducing the inefficiencies seen in FIGS. 2 and 3.

More generally, FIG. 4A may be seen as a time-frequency mask in which the bandwidth adaptively changes in response to line characteristics. Thus, FIG. 4A may be seen as a "snapshot" of an adaptively-changing time-frequency mask. In this regard, the downstream allocated time-frequency mask 410 is determined by line characteristics such as line signal-to-noise ratio (SNR) information, line attenuation information, information related to usable subcarriers (for discrete multi-tone (DMT) modulation systems), etc. Thus, for the specific embodiment of FIG. 4A, the presence of upstream signals produces different line characteristics than the absence of upstream signals, thereby resulting in a greater bandwidth allocation for downstream signals in the absence of upstream signals. Since the determination of line characteristics is described in standards documents such as International Telecommunication Union Telecommunication Standardization Sector (ITU-T) G.992.2, "Splitterless Asymmetric Digital Subscriber Line (ADSL) Transceivers" (hereinafter "ITU-T G.992.2") and ITUT G.994.1, "Handshake Procedures for Digital Subscriber Line (DSL) Transceivers" (hereinafter "ITU-T G.994.1") both published in June of 1999, further discussion of determination of line characteristics is omitted here. ITU-T G.992.2 and ITU-T G. 994.1 are incorporated herein by reference as if set forth in there entireties.

Figure 4B:
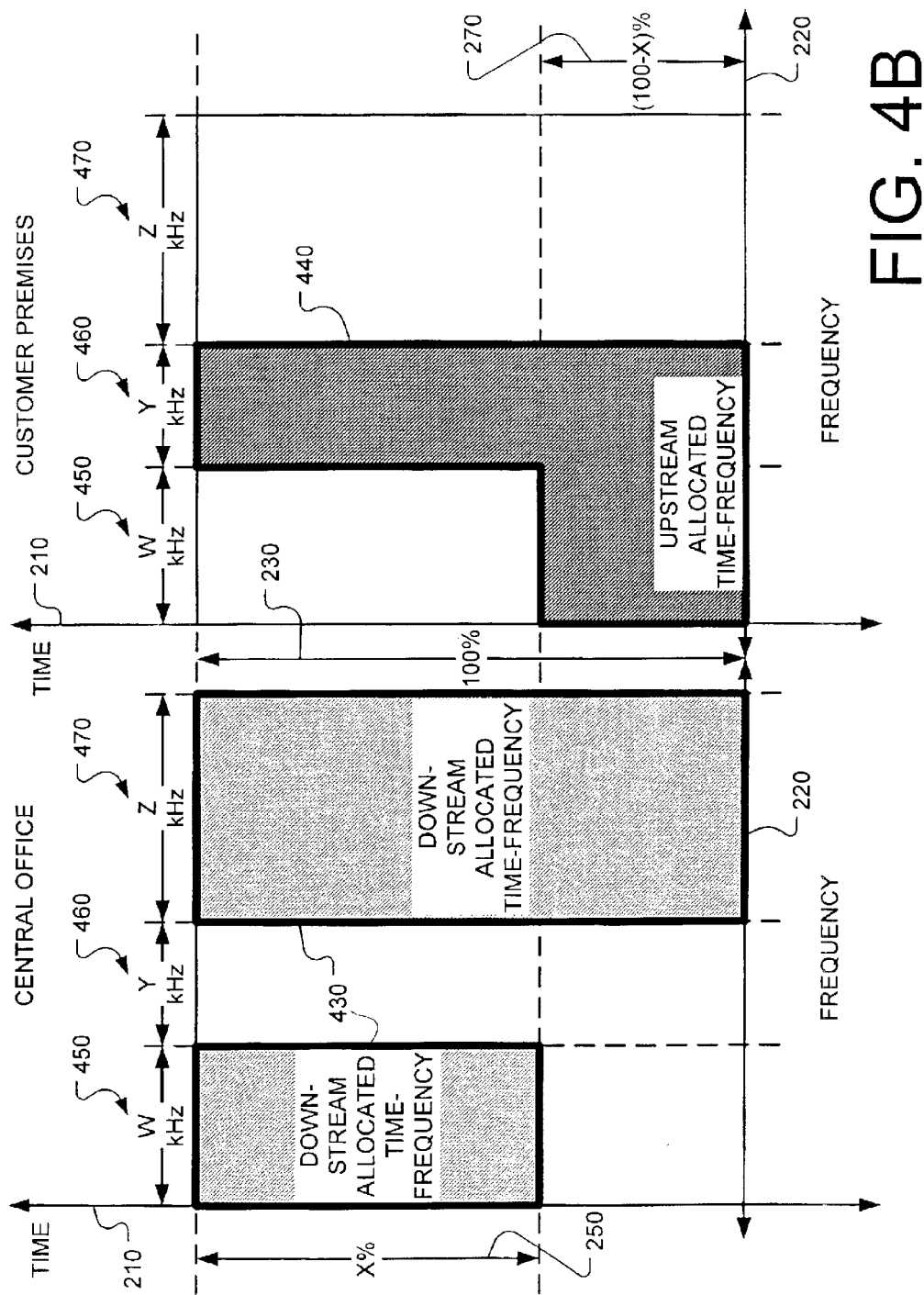
FIG. 4B is a graph showing another example of time-frequency masks without overlapping regions between upstream and downstream masks in accordance with another embodiment of the invention.

FIG. 4B is a graph showing another example of time-frequency masks without overlapping regions between upstream and downstream masks in accordance with another embodiment of the invention. Again, while a specific embodiment is shown in FIG. 4B, it will be clear to one of ordinary skill in the art that, more generally, FIG. 4B shows another adaptively-changing time-frequency mask. Two graphs are shown in which a downstream allocated time-frequency mask 430 for a central office is shown on the left graph while an upstream allocated time-frequency mask 440 for a customer premises is shown in the right graph. The graphs show frequency plotted on the x-axis 220 and time plotted on the y-axis 210, with a total data transmission time (designated as 100%) 230 divided into a downstream portion 250 (designated as X%) and an upstream portion 270 (designated as (100-X)%). As shown in FIG. 4B, both the upstream allocated time-frequency mask 440 and the downstream allocated time-frequency mask 430 are shaped such that both the customer premises and the central office, in the aggregate, utilize the entire ADSL frequency bandwidth. In this sense, the downstream allocated time-frequency mask 430 utilizes a first bandwidth 450, 470 (e.g., W+Z kHz) in the absence of upstream signals, while the downstream allocated time-frequency mask 430 utilizes a second bandwidth 470 (e.g., Z kHz) in the presence of upstream signals. Similarly, the upstream allocated time-frequency mask 440 utilizes a first bandwidth 460 (e.g., Y kHz) in the absence of downstream signals, while the upstream allocated time-frequency mask 440 utilizes a second bandwidth 450, 460 (e.g., W+Y kHz) in the presence of downstream signals. Thus, in the embodiment of FIG. 4B, the downstream mask may be seen as an adaptive mask, which (1) spans a first downstream bandwidth 450, 470 when the central office is receiving upstream signals; and (2) spans a second downstream bandwidth 470 when the central office is not receiving upstream signals. Hence, unlike the time-division multiplexing of FIG. 2 and the frequency division multiplexing of FIG. 3, the time-frequency mask of FIG. 4B utilizes the entire ADSL frequency bandwidth during 100% of the data transmission time, thereby reducing the inefficiencies seen in FIGS. 2 and 3. Also, unlike the time-frequency mask of FIG. 4A, the embodiment of FIG. 4B permits shaping of both upstream and downstream time-frequency masks, thereby permitting greater flexibility in data transmission.

FIG. 4C is a graph showing another example of time-frequency masks without overlapping regions between upstream and downstream masks in accordance with another embodiment of the invention. Again, while a specific embodiment is shown in FIG. 4C, it will be clear to one of ordinary skill in the art that, more generally, FIG. 4C shows another adaptively-changing time-frequency mask. Two graphs are shown in which a downstream allocated time-frequency mask 450 for a central office is shown on the left graph while an upstream allocated time-frequency mask 460 for a customer premises is shown in the right graph. Specifically, the time-frequency mask of FIG. 4C is referred to as a "zipper mask" due to the configuration of allocated bandwidth. The graphs show frequency plotted on the x-axis 220 and time plotted on the y-axis 210, with a total data transmission time (designated as 100%) 230. As shown in FIG. 4C, both the upstream allocated time-frequency mask 460 and the downstream allocated time-frequency mask 450 are shaped such that both the customer premises and the central office, in the aggregate, utilize the entire ADSL frequency bandwidth. In this sense, the downstream allocated time-frequency mask 450 utilizes two bandwidths 450, 470 (e.g., W+Z kHz), while the downstream allocated time-frequency mask 450 utilizes a different bandwidth 460 (e.g., Y kHz). While the snapshot view of the time-frequency mask shows a static view at a particular time, it will be clear that the two downstream bandwidths 450, 470 and the different upstream bandwidth 460 may shrink or expand as a function of determined line characteristics.

Figure 5:
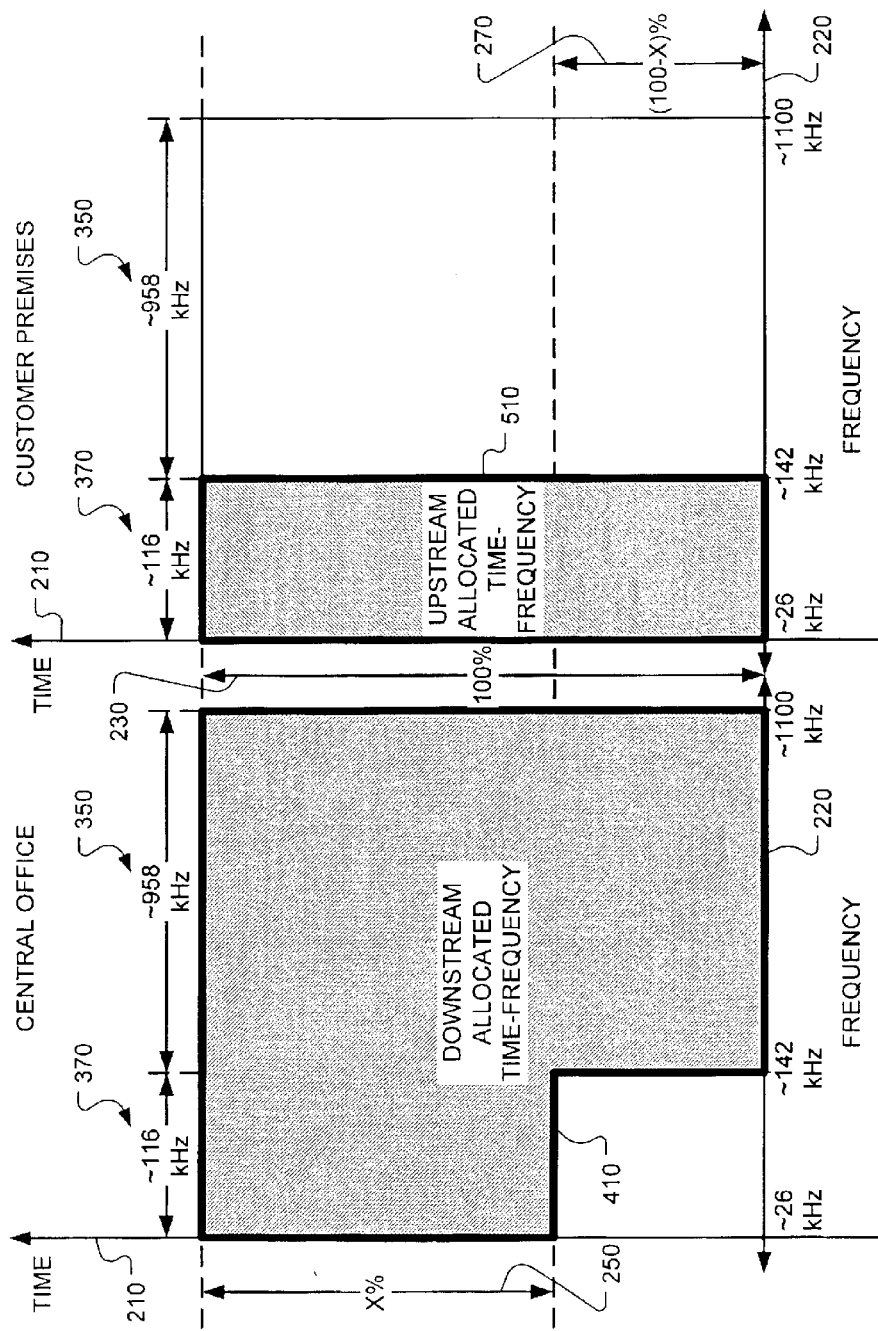
FIG. 5 is a graph showing an example of time-frequency masks having overlapping regions between upstream and downstream masks in accordance with another embodiment of the invention.

FIG. 5 is a graph showing an example of time-frequency masks having overlapping regions between upstream and downstream masks in accordance with another embodiment of the invention. Again, while a specific embodiment is shown in FIG. 5, it will be clear to one of ordinary skill in the art that, more generally, FIG. 5 shows another adaptively-changing time-frequency mask. In the embodiment of FIG. 5, an echo cancellation scheme is used, thereby permitting an upstream bandwidth to overlap with a downstream bandwidth. Two graphs are shown in which a downstream allocated time-frequency mask 410 for a central office is shown on the left graph while an upstream allocated time-frequency mask 510 for a customer premises is shown in the right graph. The graphs show frequency plotted on the x-axis 220 and time plotted on the y-axis 210. As shown in FIG. 5, allocation of an upstream bandwidth is independent of allocation of a downstream bandwidth. Thus, during a portion of the time (X%) 250, both upstream and downstream signals may be transmitted using the same bandwidth 370. Additionally, during another portion of the time (100-X%) 270, only upstream signals may be transmitted within that bandwidth 370. Since overlap modes, such as echo-cancellation modes, are well known in the art, further discussion of such modes are omitted here. It is, however, worthwhile to note that echo-cancellation or overlap modes permit a more efficient use of bandwidth in lieu of increased complexity and costs.

Figure 6:
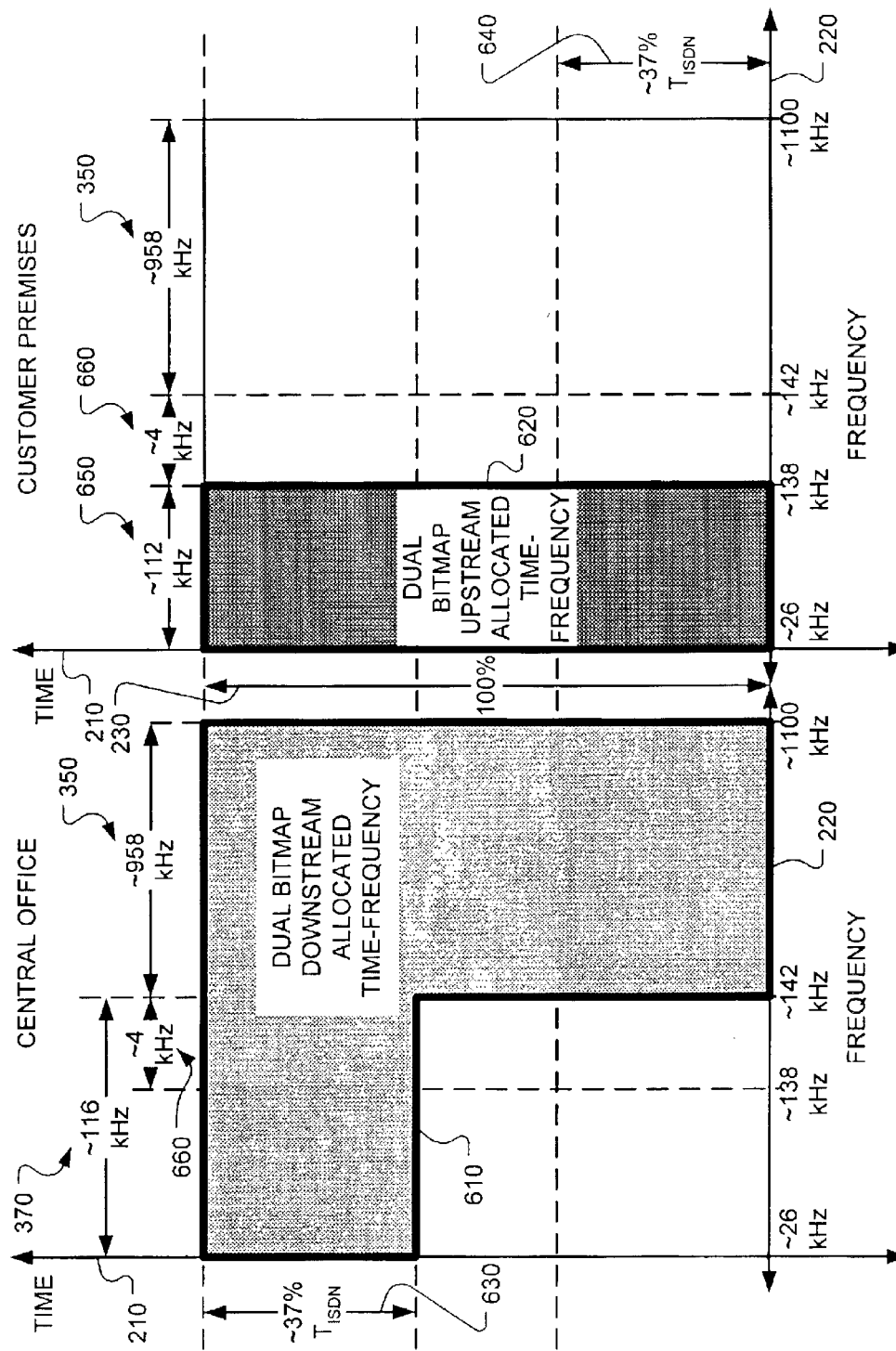
FIG. 6 is a graph showing an example of time-frequency masks having partially-overlapping regions between upstream and downstream masks in accordance with another embodiment of the invention.

FIG. 6 is a graph showing an example of time-frequency masks having partially-overlapping regions between upstream and downstream masks in accordance with another embodiment of the invention. As shown in FIG. 6, both the upstream time-frequency mask 610 and the downstream time-frequency mask 620 are loaded with dual bit-mapped data. Since dual bit-mapping schemes are known in the art, only a cursory description of dual bit-mapping is presented here.

In digital communication systems (e.g., systems employing discrete multi-tone (DMT) modulation schemes), the number of bits that may be loaded into discrete sub-carriers (or bins) is determined as a function of a desired bit-error rate (BER) and a measured signal-to-noise ratio (SNR). Generally, for a given BER, a greater SNR permits greater data capacity (i e, greater data loading). Conversely, a reduced SNR results in reduced data capacity. For systems employing a single bit-mapping scheme, the data capacity is determined for the worst possible SNR, and various sub-carriers (or bins) are loaded with data as a function of the determined data capacity. Thus, for single bit-mapping systems, the same data-loading scheme is used regardless of whether or not there is overlap between, the upstream and downstream time-frequency masks. In this regard, for single bit-mapping systems, the data-loading scheme for non-overlapping regions of the time-frequency mask is the same as for the overlapping regions of the time-frequency mask even when there may be available capacity for more data.

In the embodiment of FIG. 6, a dual bit-mapping scheme is shown for both the upstream time-frequency mask 620 and the downstream time-frequency mask 610. In this regard, a first data-loading scheme is used in the upstream bandwidth 650 during the overlapping time 630 and a different data-loading scheme is used in the upstream bandwidth 650 during the non-overlapping time 640. This dual bit-mapping scheme results in a greater data capacity for upstream signals. Similarly, different data-loading schemes are used for the downstream time-frequency mask 610 during the overlapping time 630 than during the non-overlapping time 640. In this regard, the dual bitmapping scheme of FIG. 6 permits greater data capacity for both upstream and downstream signals.

Figure 7:
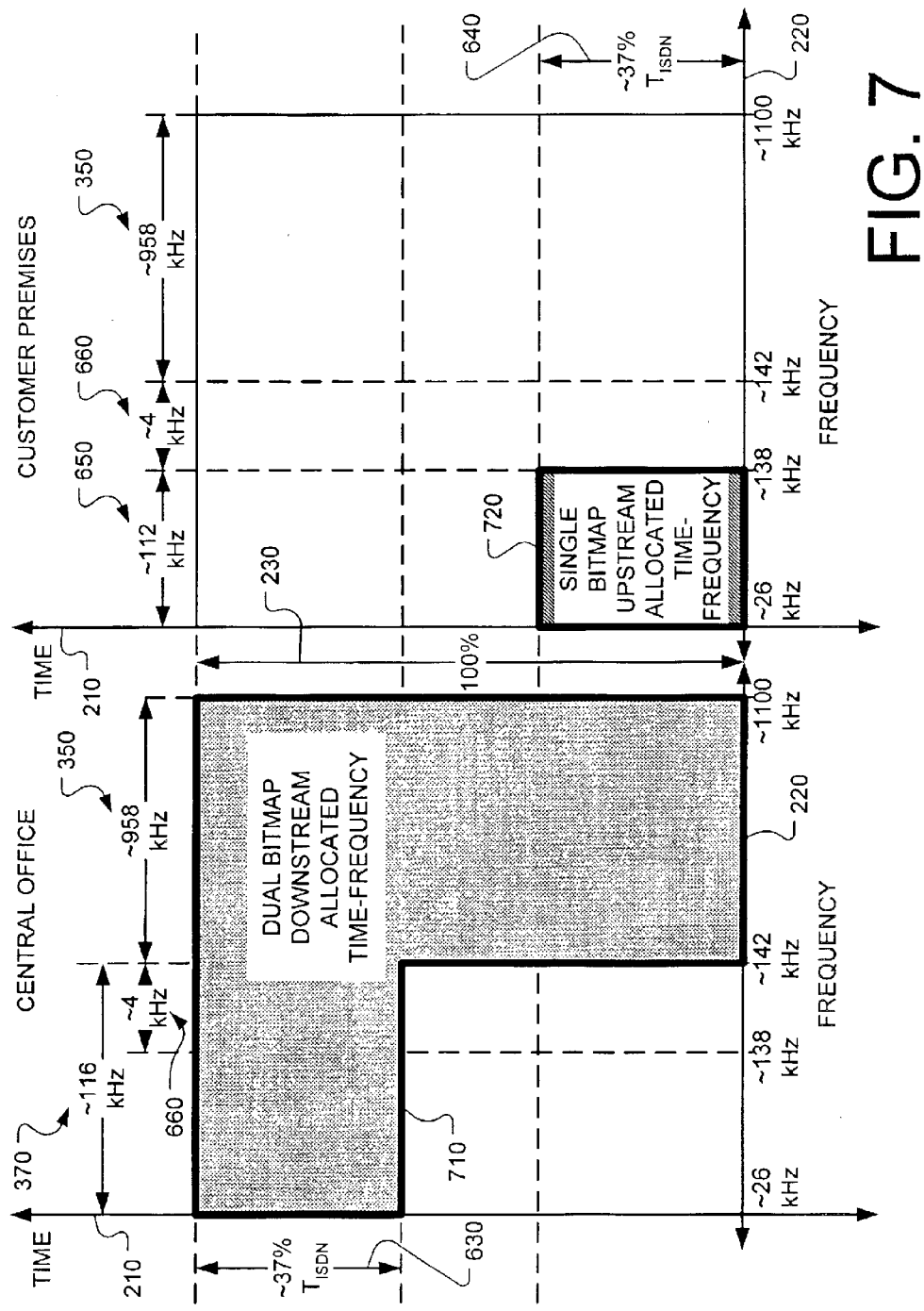
FIG. 7 is a graph showing an example of time-frequency division multiplexing without overlapping regions between upstream and downstream masks, in accordance with another embodiment of the invention.

FIG. 7 is a graph showing an example of time-frequency division multiplexing with overlapping regions between upstream and downstream masks, in accordance with another embodiment of the invention. Unlike FIG. 6, which showed both upstream and downstream signals being loaded using a dual bit-mapping scheme, FIG. 7 shows the downstream signals being loaded using a dual bit-mapping scheme while the upstream signals are loaded using a single bit-mapping scheme. Since much of the inefficiency in signal transmission resides with downstream signal transmission, the dual bitmapping of downstream signals greatly increases the efficiency in overall signal transmission. Since dual bit-mapping schemes are discussed with reference to FIG. 6, further discussion of dual bit-mapping schemes is omitted here. It is, however, worthwhile to note that due to the dual bit-mapping scheme of the downstream allocated time-frequency mask 710, a greater data capacity is achievable for downstream signals in the presence of non-stationary noise.

Figure 8:
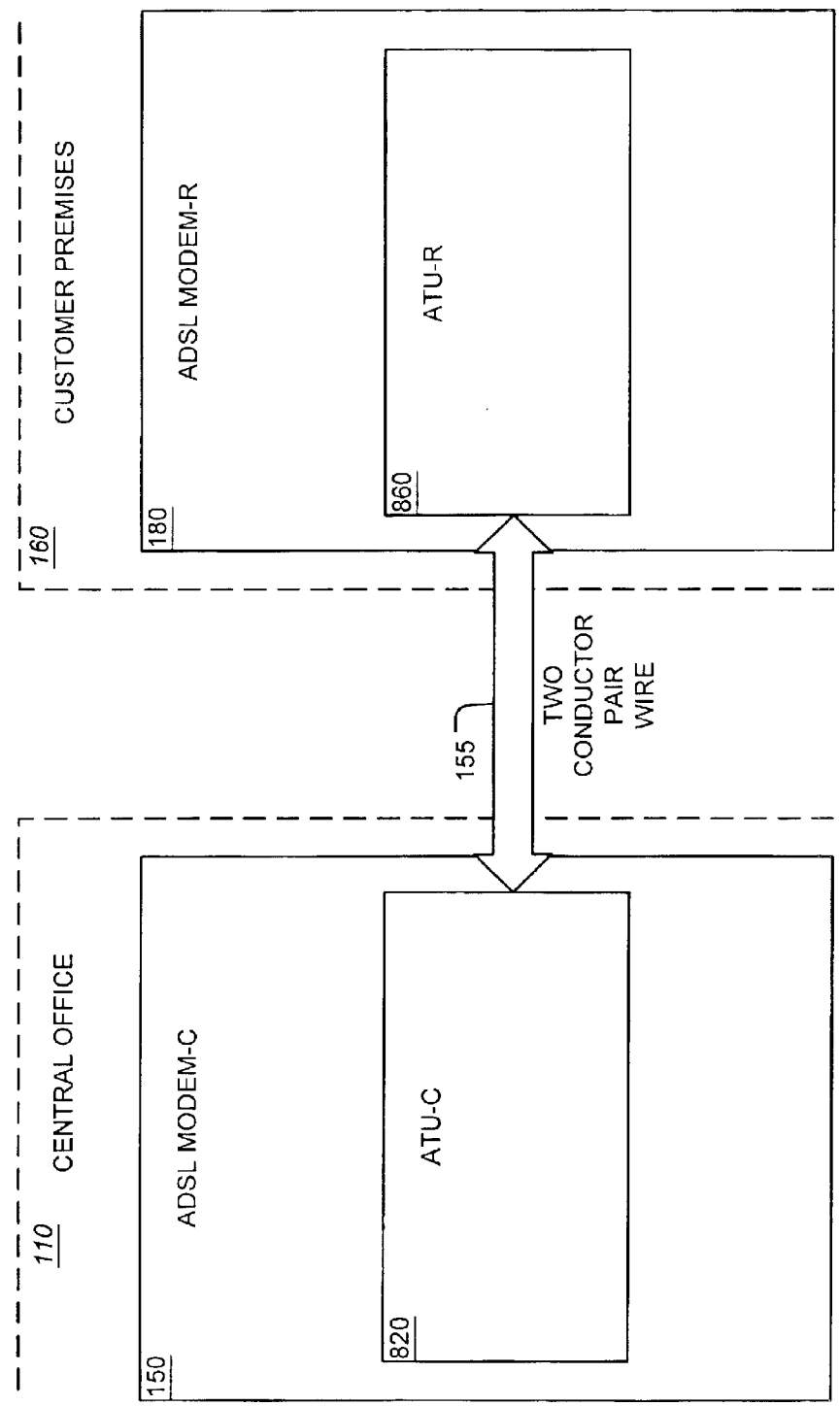
FIG. 8 is a block diagram showing one embodiment of the ADSL modem of FIG. 1 in greater detail.

FIG. 8 is a block diagram showing one embodiment of the ADSL modems 150, 180 of FIG. 1 in greater detail. As shown in FIG. 8, the ADSL modem 150 at the central office 110 includes an ADSL transceiver unit (ATU-C) 820 that is configured to transmit downstream signals and receive upstream signals through the two-conductor pair wire 155. On the other end of the local loop 155, at the ADSL modem 180 of the customer premises 160, a remote ADSL transceiver unit (ATU-R) 860 is configured to receive the downstream signals from the ATU-C 820 and transmit the upstream signals from the ATU-R 860 to the ATU-C 820. By selectively altering bandwidth for downstream signals as a function of upstream signals, for example, as shown in FIGS. 4A through 7, greater data capacity may be achieved. In other words, by altering both the time and frequency characteristics of the downstream time-frequency mask, greater data capacity may be achieved. An example system configured to alter the characteristics of the downstream time-frequency mask is shown in FIG. 9.

Figure 9:
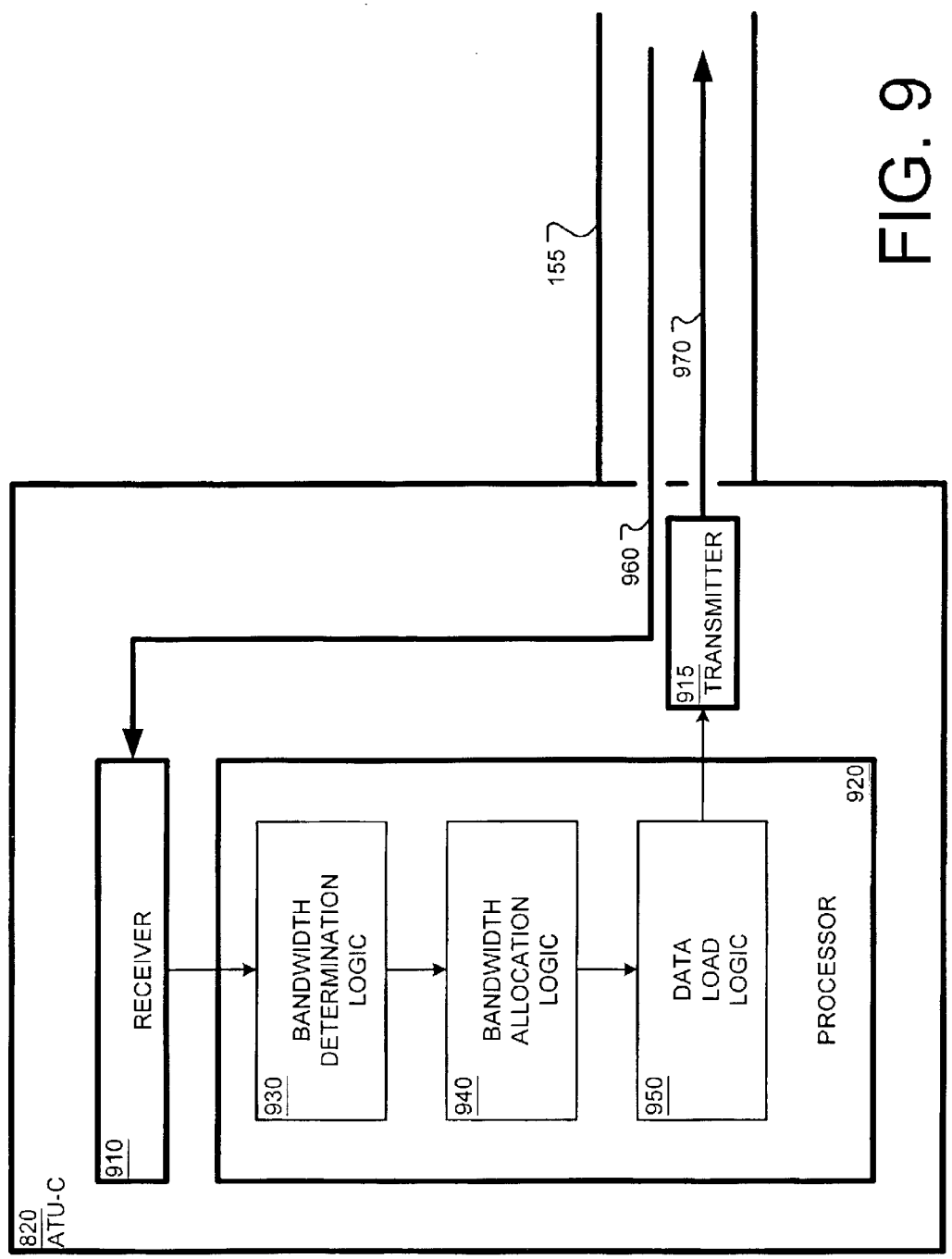
FIG. 9 is a block diagram showing one embodiment of the ADSL transceiver unit (ATU) of FIG. 8 in greater detail.

FIG. 9 is a block diagram showing one embodiment of the ATU-C 820 of FIG. 8 in greater detail. As shown in FIG. 9, the ATU-C 820 comprises a receiver 910 configured to receive signals 960 through the two-conductor pair wire 155. The received signals have certain signal characteristics, which are indicative of line characteristics. For example, the received signals have information related to SNR, line attenuation, usable sub-carriers (for digital systems such as DMT modulation systems), etc. The ATU-C 820 also comprises a processor 920 configured to determine an appropriate bandwidth, allocate the determined bandwidth, and load data into the allocated bandwidth. In this sense, the processor 920 may be seen as comprising bandwidth determination logic 930, bandwidth allocation logic 940, and data loading logic 950.

In operation, the receiver 910 receives a signal having various signal characteristics, which are indicative of line characteristics. The received signals are input to the bandwidth determination logic 930, which determines line characteristics and, subsequently, determines the downstream bandwidth for transmission of downstream signals. Since determination of line characteristics is discussed in detail in ITU-T G.992.2 and ITU-T G.994.1, further discussion of determining line characteristics is omitted here.

Once the downstream bandwidth is determined by the bandwidth determination logic 930, the determined bandwidth is relayed to the bandwidth allocation logic 940, which allocates the downstream bandwidth for transmission of downstream signals. In one embodiment, the downstream bandwidth is determined as a function of whether or not the receiver is receiving upstream signals. In this regard, a first bandwidth is allocated when upstream signals are being received at the receiver 910, while a second bandwidth is allocated when upstream signals are not being received at the receiver 910. In a preferred embodiment, the first bandwidth has a frequency range between approximately 142 kHz and approximately 1100 kHz, and the second downstream bandwidth has a frequency range between approximately 26 kHz and approximately 1100 kHz. Thus, in this embodiment, upon allocating either the first downstream bandwidth or the second downstream bandwidth, the data loading logic 950 loads data into the allocated bandwidth. As described with reference to FIGS. 4A through 7, the data may be loaded using either a single bit-mapping scheme or a dual bit-mapping scheme. The loaded data is then transmitted by a transmitter 915 as a downstream signal 970 through the two-conductor pair wire 155.

Figure 10:
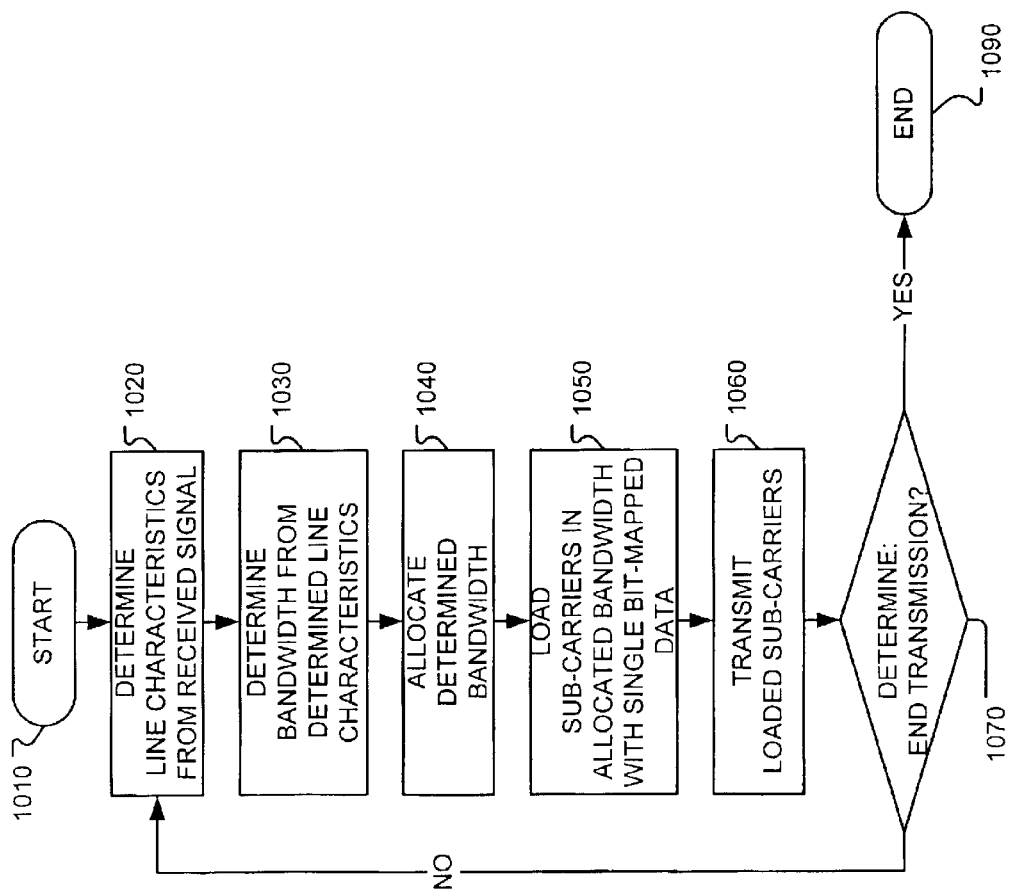
FIG. 10 is a flowchart showing method steps in accordance with one embodiment of the invention.
Figure 11:
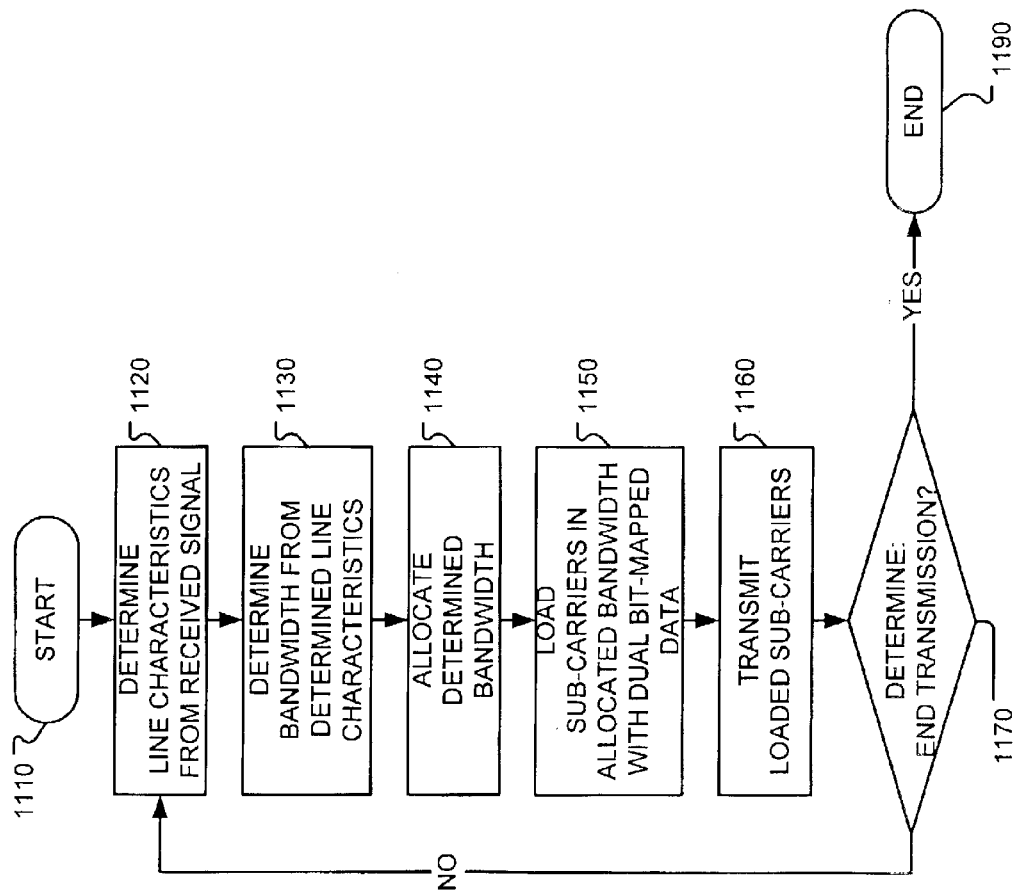
FIG. 11 is a flowchart showing method steps in accordance with another embodiment of the invention.

Having described several embodiments of systems for transmitting signals using the time frequency masks of FIGS. 4A through 7, attention is turned to FIGS. 10 and 11, which show method steps in accordance with several embodiments of the invention.

FIG. 10 is a flowchart showing method steps associated with adaptively allocating a downstream bandwidth in response to determined line characteristics. As shown in FIG. 10, line characteristics are determined (1020) from a received signal. Since the determination of line characteristics is well known in the art, further discussion of determining line characteristics is omitted here. From the determined (1020) line characteristics, a bandwidth for downstream signal transmission is further determined (1030). Upon determining (1030) the bandwidth for downstream signals transmission, the determined (1030) bandwidth is allocated (1040). Sub-carriers within the allocated (1040) bandwidth are then loaded (1050) with single bit-mapped data. The loaded sub-carriers are then transmitted (1060). Thereafter, it is determined (1070) whether or not signal transmission has ended. If it is determined (1070) that signal transmission has ended, then the process ends (1090). If, however, it is determined that signal transmission has not ended, then the process repeats with the determining (1020) of line characteristics. As seen from FIG. 10, the allocated (1040) bandwidth for the transmission of downstream signals may adaptively change as the line characteristics change. Thus, it is possible to maximize the data capacity by varying the bandwidth according to changing line characteristics.

In a preferred embodiment, the process of FIG. 10 may allocate bandwidths according to the time-frequency masks as shown in FIGS. 4A through 7. However, it will be clear to one of ordinary skill in the art that other time-frequency masks may be used to optimize efficiency in data transmission and reception.

FIG. 11 is a flowchart showing method steps in another embodiment of the invention. As shown in FIG. 11, line characteristics are determined (1120) from a received signal. Since the determination of line characteristics is well known in the art, further discussion of determining line characteristics is omitted here. From the determined (1120) line characteristics, a bandwidth for downstream signal transmission is further determined (1130). Upon determining (1130) the bandwidth for downstream signals transmission, the determined (1130) bandwidth is allocated (1140). Sub-carriers within the allocated (1140) bandwidth are then loaded (1150) with dual bit-mapped data. The loaded sub-carriers are then transmitted (1160). Thereafter, it is determined (1170) whether or not signal transmission has ended. If it is determined (1170) that signal transmission has ended, then the process ends (1190). If, however, it is determined that signal transmission has not ended, then the process repeats with the determining (1120) of line characteristics. As seen from FIG. 11, the allocated (1140) bandwidth for the transmission of downstream signals may adaptively change as line characteristics change. Thus, it is possible to maximize the data capacity by varying the bandwidth according to the changing line characteristics.

In a preferred embodiment, the process of FIG. 11 may allocate bandwidths according to the time-frequency masks as shown in FIGS. 4A through 7. However, it will be clear to one of ordinary skill in the art that other time-frequency masks may be used to optimize efficiency in data transmission and reception.

As seen in the embodiments of FIGS. 10 and 11, the bandwidth for signal transmission (whether upstream or downstream) may be adaptively allocated as a function of available bandwidth. Thus, for example, if signals are being received in a certain frequency bandwidth, other usable frequency bandwidths may be used for signal transmission. Alternatively, if signals are not being received, then the entire usable frequency bandwidth may be used for signal transmission. This results in a more efficient use of the entire frequency bandwidth, thereby increasing data capacity. In a more general sense, depending on line characteristics, the bandwidth of the downstream and upstream time-frequency masks may adaptively change to optimize the data capacity.

The bandwidth determination logic 930 (FIG. 9), the bandwidth allocation logic 940 (FIG. 9), and the data loading logic 950 (FIG. 9) of the present invention can be implemented in hardware, software, firmware, or a combination thereof. In the preferred embodiment, the bandwidth determination logic 930 (FIG. 9), the bandwidth allocation logic 940 (FIG. 9), and the data loading logic 950 (FIG. 9) are implemented in software or firmware that is stored in a memory and that is executed by a suitable instruction execution system. If implemented in hardware, as in an alternative embodiment, the bandwidth determination logic 930 (FIG. 9), the bandwidth allocation logic 940 (FIG. 9), and the data loading logic 950 (FIG. 9) can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Although an exemplary embodiment of the present invention has been shown and described, it will be apparent to those of ordinary skill in the art that a number of changes, modifications, or alterations to the invention as described may be made, none of which depart from the spirit of the present invention. For example, while a specific context of downstream signal transmission is used to illustrate several embodiments of the invention, it will be clear to one of ordinary skill in the art that the system and method may be used in upstream signal transmission. Furthermore, while a specific context of ADSL systems is used to illustrate various features of the invention, it will be clear to one of ordinary skill in the art that the time-frequency masks as described in FIGS. 4A through 7 may be used by other communication systems (e.g., wireless communication, satellite network, fiber optics networks). Moreover, while only five specific examples of time-frequency masks are shown with reference to FIGS. 4A through 7, it will be clear to one of ordinary skill in the art that other permutations of the time-frequency mask may be implemented. Also, while specific frequency ranges have been shown for purposes of illustration, it will be clear to one of ordinary skill in the art that the specific frequency ranges are a matter of design choice, and, hence, may be altered to suit various systems implementing time-frequency masks. All such changes, modifications, and alterations should therefore be seen as within the scope of the present invention.

We claim:

1. A communication system, comprising:

a receiver configured to receive signals, the signals having signal characteristics, the signal characteristics being indicative of line characteristics; and bandwidth determination logic configured to adaptively determine a downstream bandwidth in response to the received signals, the bandwidth determination logic further being configured to determine a first downstream bandwidth during reception of upstream signals, the bandwidth determination logic further being configured to determine a second downstream bandwidth during non-reception of upstream signals.

2. The system of claim 1, wherein the communication system is a discrete multi-tone (DMT) modulation system.

3. The system of claim 2, wherein the signal characteristics comprise:
   line signal-to-noise ratio information;
   line attenuation information; and
   information related to usable sub-carriers in the DMT modulation system.

4. The system of claim 2, further comprising data loading logic configured to load sub-carriers in the DMT modulation system with data, the sub-carriers being located within the adaptively determined downstream bandwidth.

5. The system of claim 4, wherein the data loading logic is further configured to load the sub-carriers using a single bit-mapping scheme.

6. The system of claim 4, wherein the data loading logic is further configured to load the sub-carriers using a dual bit-mapping scheme.

7. The system of claim 1, wherein:
   the first downstream bandwidth has a frequency range between approximately 142 kHz and approximately 1100 kHz; and
   the second downstream bandwidth has a frequency range between approximately 26 kHz and approximately 1100 kHz.

8. In a digital subscriber line (DSL) system employing discrete multi-tone (DMT) technology, a mask, comprising:
   a time slot allocated to carry downstream signals, wherein the time slot is configured to adaptively change in response to line characteristics; and
   a frequency bandwidth allocated to carry the downstream signals, wherein the frequency bandwidth is configured to adaptively change in response to the line characteristics.

9. A method comprising:
   determining line characteristics; and
   adaptively allocating a downstream bandwidth in response to the determined line characteristics, the adaptive allocating of the downstream bandwidth comprising:
      allocating a first downstream bandwidth during reception of upstream signals; and
      allocating a second downstream bandwidth during non-reception of upstream signals.

10. The method of claim 9, wherein the determining line characteristics comprises:
    determining line signal-to-noise ratio information;
    determining line attenuation information; and
    determining information related to usable sub-carriers in a discrete multi-tone (DMT) modulation system.

11. The method of claim 10, further comprising:
    loading sub-carriers in the DMT modulation system with data.

12. The method of claim 11, wherein the loading the sub-carriers in the DMT modulation system with data comprises:
    loading the sub-carriers using a single bit-mapping scheme.

13. The method of claim 11, wherein the loading the sub-carriers in the DMT modulation system with data comprises:
    loading the sub-carriers using a dual bit-mapping scheme.

14. The method of claim 9, wherein the allocating the first downstream bandwidth comprises:
    allocating a frequency range between approximately 142 kHz and 1100 kHz.

15. The method of claim 9, wherein the allocating the second downstream bandwidth comprises:
    allocating a frequency range between approximately 26 kHz and 1100 kHz.

16. A system comprising:
    means for determining line characteristics during reception of upstream signals;
    means for determining line characteristics during non-reception of upstream signals;
    means for adaptively allocating a downstream bandwidth in response to the determined line characteristics;
    means for allocating a first downstream bandwidth during reception of upstream signals;
    means for allocating a second downstream bandwidth during non-reception of upstream signals.

17. The system of claim 16 wherein each means for determining line characteristics comprises:
    means for determining line signal-to-noise ratio information;
    means for determining line attenuation information; and
    means for determining information related to usable sub-carriers in a discrete multi-tone (DMT) modulation system.

18. The system of claim 17, further comprising:
    means for loading sub-carriers in the DMT modulation system with data.

19. The system of claim 18, wherein the means for loading the sub-carriers in the DMT modulation system with data comprises:
    means for loading the sub-carriers using a single bit-mapping scheme.

20. The system of claim 18, wherein the means for loading the sub-carriers in the DMT modulation system with data comprises:
    means for loading the sub-carriers using a dual bit-mapping scheme.

21. A communication system, comprising:
    means for receiving a set of signals, the set of signals having signal characteristics, the signal characteristics being indicative of line characteristics;
    means for adaptively determining a first downstream bandwidth, the means for adaptively determining the first downstream bandwidth being responsive to the means for receiving the set of signals; and
    means for adaptively determining a second downstream bandwidth, the means for adaptively determining the second downstream bandwidth being responsive to the means for receiving the set of signals.

* * * * *